United States Patent [19]

Scott

[11] 4,194,687
[45] Mar. 25, 1980

[54] PNEUMATIC CONTROL SYSTEM AND PARTS THEREFOR AND METHODS OF MAKING THE SAME

[75] Inventor: Douglas R. Scott, Knoxville, Tenn.

[73] Assignee: Robertshaw Controls Company, Richmond, Va.

[21] Appl. No.: 864,455

[22] Filed: Dec. 27, 1977

[51] Int. Cl.² .......................................... G05D 23/08
[52] U.S. Cl. ..................................... 236/87; 251/61.2
[58] Field of Search ................... 236/49, 86, 87, 91 R, 236/91 D; 251/61.2, 61.3; 137/84

[56] References Cited

U.S. PATENT DOCUMENTS

| 3,263,925 | 8/1966 | Joesting | 236/9 |
|---|---|---|---|
| 3,377,022 | 4/1968 | Beatenbough et al. | 236/86 X |
| 3,448,659 | 6/1969 | Beatenbough et al. | 236/86 X |
| 3,498,332 | 3/1970 | Lybrook | 236/86 X |
| 3,661,164 | 5/1972 | Kreuter et al. | 137/85 |
| 4,005,821 | 2/1977 | Slavin et al. | 236/87 |
| 4,007,775 | 2/1977 | Caldwell | 236/49 X |

*Primary Examiner*—William E. Wayner
*Assistant Examiner*—William E. Tapolcai, Jr.
*Attorney, Agent, or Firm*—Candor, Candor & Tassone

[57] ABSTRACT

A pneumatic control system for controlling a pneumatically operated device in relation to the operation of a pneumatic signal sending thermostat and a pneumatic signal sending set point adjuster, the set point adjuster being adapted to direct its pneumatic signal to pneumatically operated temperature setting means of the thermostat to set the thermostat to a particular temperature thereof whereby the thermostat is adapted to direct its pneumatic signal to the device to control the device in relation to the differential between the temperature sensed by the thermostat and the temperature setting thereof. The thermostat has an output chamber for directing its pneumatic signal and is disposed remote from the pneumatically operated temperature setting means thereof. The set point adjuster has a temperature sensor for changing its setting in relation to sensed temperature thereof. The set point adjuster has a setting means that includes an adjustable spring member that also comprises the temperature sensor thereof.

14 Claims, 5 Drawing Figures

PNEUMATIC CONTROL SYSTEM AND PARTS THEREFOR AND METHODS OF MAKING THE SAME

BACKGROUND OF THE INVENTION

1. Field of the Invention

This invention relates to an improved pneumatic control system for controlling a pneumatically operated device and to an improved thermostat and set point adjuster for such a system or the like as well as to methods of making such a thermostat and set point adjuster.

2. Prior Art Statement

It is known to provide a pneumatic control system for controlling a pneumatically operated device in relation to the operation of a pneumatic signal sending thermostat and a pneumatic signal sending set point adjuster.

For example, see the following item:

(1) U.S. Pat. No. 3,693,706—Nisley et al.

It appears that the pneumatic control system of item (1) above has a comparator for respectively receiving the pneumatic signal from the thermostat and the pneumatic signal from the set point adjuster and through internal diaphragm means thereof will control the flow of pneumatic fluid between a pneumatic source and a pneumatically operated device for a heat exchanger for a transportation vehicle to set the pneumatically operated device in relation to the pneumatic signals being received by the comparator.

The set point adjuster of item (1) above has a spring acting on a valve means thereof, the force of the spring being set by manually operated adjustable setting means of the set point adjuster to set the value of the signal produced thereby.

It is also known to provide a thermostat construction having means for directing a pneumatic signal to a pneumatically operated control device to control that device in relation to the differential between the temperature sensed by the thermostat construction and the temperature setting of the adjustable temperature setting means thereof.

For example, see the following item:

(2) U.S. Pat. No. 3,221,991—Houser.

It appears that the pneumatic thermostat of item (2) above has manual means for adjusting the temperature setting of the bimetal means of the pneumatic thermostat construction, the manual means comprising a threaded relationship between parts of the housing. One of the parts of the housing carries the bimetal member and another part of the housing carries the diaphragm valve means to thereby provide an adjustment therebetween which corresponds to the temperature setting for the thermostat.

The pneumatic thermostat of item (1) above also has a threaded adjusting member to set the initial force of the bimetal member thereof.

It is also known to provide a thermostat construction having pneumatically operated temperature setting means therefor with such setting means being adapted to receive a signal from a set point adjuster that has manual means for adjusting the same and a temperature sensor for changing the setting of the set point adjuster.

For example, see the following item:

(3) U.S. Pat. No. 3,263,925—Joesting.

It appears that the pneumatically operated temperature setting diaphragm of the thermostat of item (3) above forms part of the output chamber thereof and that the manual adjusting means for the set point adjuster thereof is an item separate from the temperature sensing means of the set point adjuster which changes the setting thereof upon changes in sensed temperature.

SUMMARY OF THE INVENTION

It is known that the manual manipular means for operating the heat exchanger system for a transportation vehicle, such as an automobile, comprise relatively long pivotally mounted levers arranged behind the dash board and have the free ends thereof projecting out of a control panel on the dash board of the vehicle so that the operator can grasp the same and move such levers to the desired positions thereof, such as positions providing mode selection and temperature settings.

Such levers are relatively long in order to provide a desired mechanical advantage to operate the devices interconnected thereto whereby considerable space must be provided for such manipular means behind the dash board of the vehicle. However, it is found that not only is the size of transportation vehicles decreasing from an energy standpoint to thereby cause space to be at a premium, but also the trend toward the use of air bag systems for such vehicles further diminishes the amount of space that can be utilized behind the dashboard for other purposes.

Accordingly, it is a feature of this invention to provide a pneumatic selector means for controlling such heat exchanger systems wherein the need for such conventional manipular lever system is eliminated.

It is another feature of this invention to provide an improved thermostat for such a system or the like.

It is also a feature of this invention to provide an improved set point adjuster for such a system or the like.

In particular, one embodiment of this invention provides a pneumatic control system for controlling a pneumatically operated device, such as a pneumatically operated device for a heat exchanger of a transportation vehicle or the like, in relation to the operation of a pneumatic signal sending thermostat and a pneumatic signal sending set point adjuster. The thermostat has pneumatically operated temperature setting means therefor whereby the set point adjuster can direct its pneumatic signal to the setting means to set the thermostat to a particular setting thereof so that the thermostat will direct its pneumatic signal to the device to control the device in relation to the differential between the temperature sensed by the thermostat and the temperature setting thereof. The thermostat has an output chamber for directing its pneumatic signal to the device, the output chamber being located remote from the pneumatically operated temperature setting means thereof. The set point adjuster has a temperature sensor for changing its setting means in relation to sensed temperature thereof, such as by the temperature outside the vehicle. The set point adjuster has its setting means including an adjustable spring member that also comprises the temperature sensor for the set point adjuster.

Accordingly, it is an object of this invention to provide an improved pneumatic control system having one or more of the novel features of this invention as set forth above or hereinafter shown or described.

Another object of this invention is to provide an improved thermostat construction for such a system or the like, the thermostat construction of this invention having one or more of the novel features of this invention as set forth above or hereinafter shown or described.

Another object of this invention is to provide an improved set point adjuster for such a system or the like, the set point adjuster of this invention having one or more of the novel features of this invention as set forth above or hereinafter shown or described.

Other objects of this invention are to provide improved methods of making such a thermostat construction and set point adjuster, the methods of this invention each having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 5 is a schematic view, illustrating the pneumatic control system of this invention, FIG. 5 illustrating in cross-section the improved thermostat construction of this invention as well as the pneumatically operated means for controlling the heat exchanger means of a transportation vehicle or the like.

DESCRIPTION OF THE PREFERRED EMBODIMENTS

Figure 1:
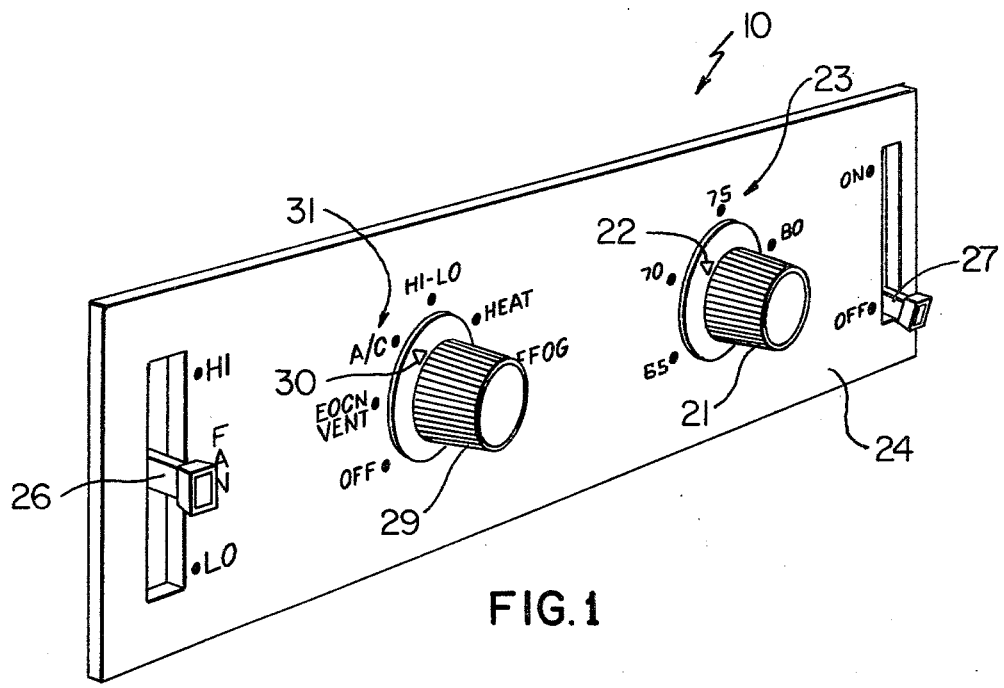
FIG. 1 is a perspective view of the improved control panel of this invention for controlling the pneumatic system of this invention that is schematically illustrated in FIG. 5.

While the various features of this invention are hereinafter described and illustrated as being particularly adapted to provide a pneumatic control system for the heat exchanger means of a transportation vehicle, it is to be understood that the various features of this invention can be utilized singly or in any combination thereof to provide a control system for other devices as desired.

Also, while other features of this invention are hereinafter described and illustrated as being particularly adapted to provide a thermostat construction and/or set point adjuster for such a control system or the like, it is to be understood that the various features of this invention can be utilized singly or in any combination thereof to provide a thermostatic construction and/or set point adjuster for other uses as desired.

Therefore, this invention is not to be limited to only the embodiments illustrated in the drawings, because the drawings are merely utilized to illustrate one of the wide variety of uses of this invention.

Figure 2:
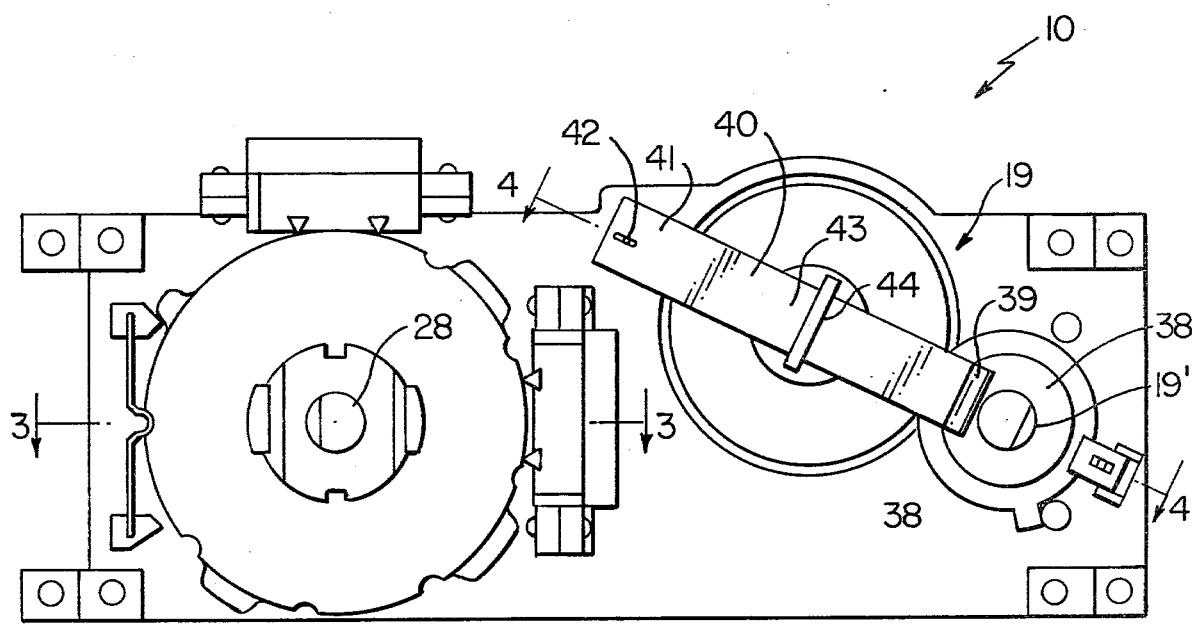
FIG. 2 is an enlarged front view of the control panel of FIG. 1 with the front panel removed to illustrate the mode selector and temperature set point adjuster thereof.
Figure 5:
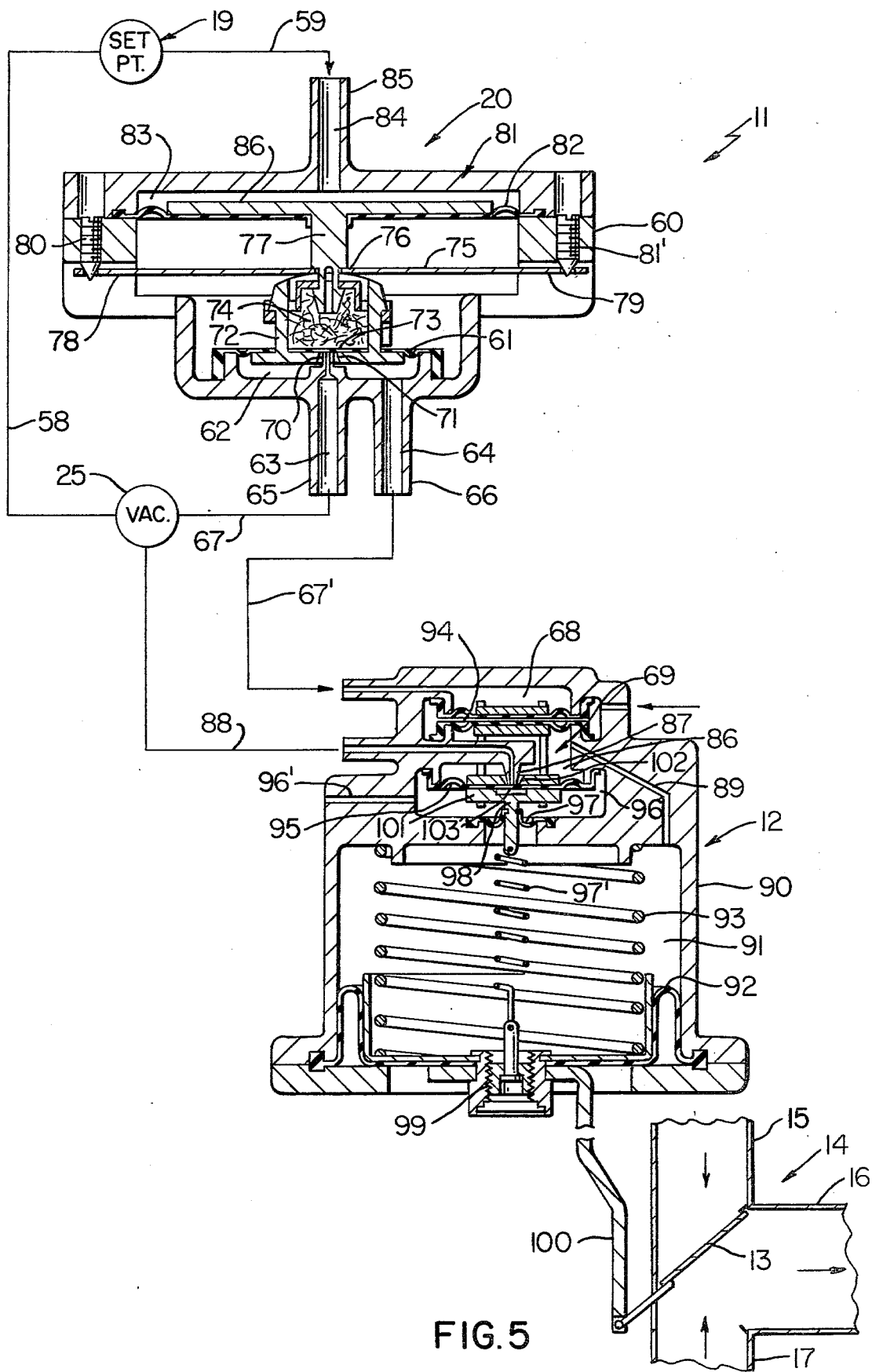

Referring now to FIGS. 1 and 2, an improved control panel of this invention for the dash board of a transportation vehicle or the like is generally indicated by the reference numeral 10 and is adapted to provide the manual selector means for setting the pneumatic control system of this invention that is generally indicated by the reference numeral 11 in FIG. 5 and which comprises a pneumatically operated device 12 that controls a movable damper door 13 of a transportation vehicle heat exchanger means 14, the heat exchanger means 14 having a duct 15 for supplying chilled air to a mixed air exit duct 16 that also has a heated air duct 17 interconnected thereto whereby the position of the damper door 13 will determine the temperature of the mixed air leaving the exit duct 16 to the interior of the transportation vehicle in a manner well known in the art.

Figure 3:
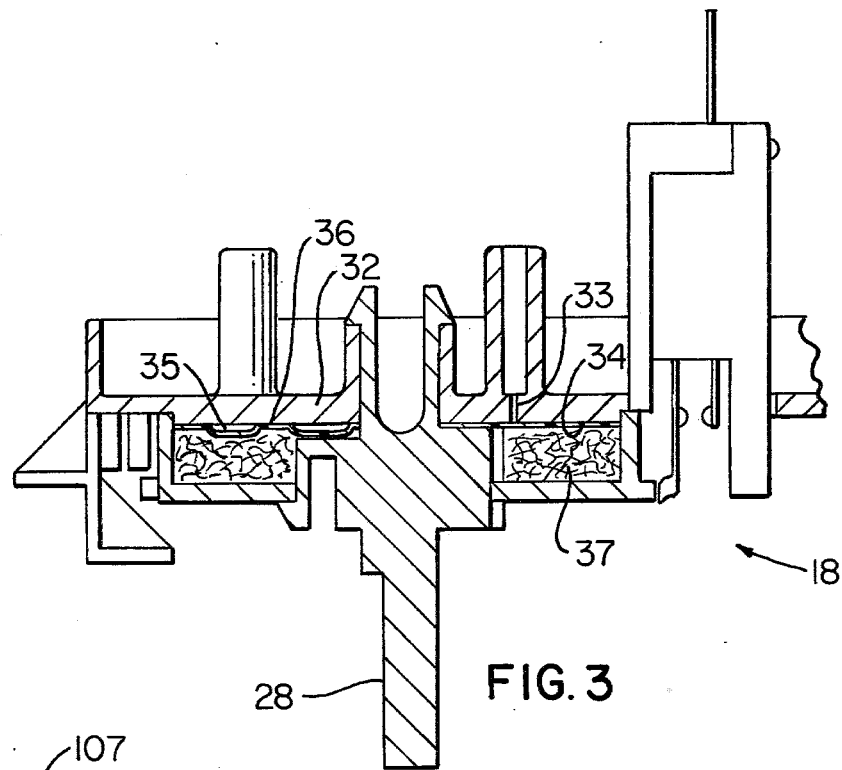
FIG. 3 is a fragmentary cross-sectional view taken on line 3—3 of FIG. 2 and illustrates the mode selector.
Figure 4:
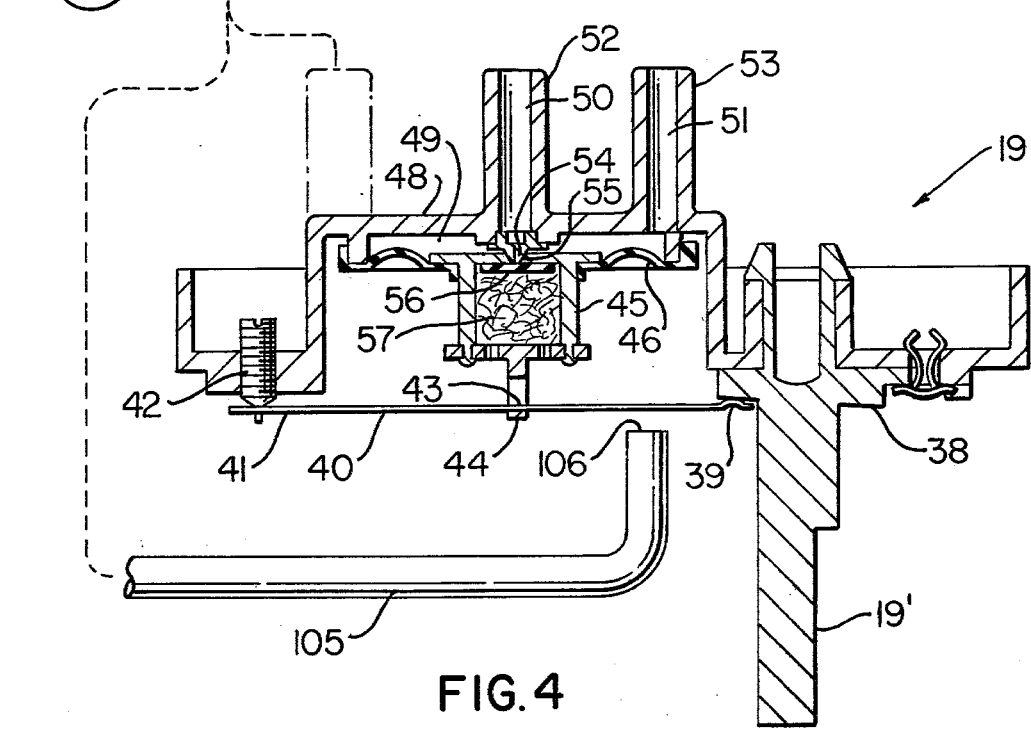
FIG. 4 is a fragmentary cross-sectional view taken on line 4—4 of FIG. 2 and illustrates the set point adjuster, FIG. 4 also schematically illustrating the means of this invention for sensing outside temperature to modify the set point adjuster.

The pneumatic control system 11 of this invention comprises in addition to the pneumatically operated device 12, a mode selector that is generally indicated by the reference number 18 in FIGS. 2 and 3, a temperature selector or set point adjuster of this invention that is generally indicated by the reference numeral 19 in FIGS. 2, 4 and 5 and a thermostat construction of this invention that is generally indicated by the reference numeral 20 in FIG. 5.

The set point adjuster 19 has a rotatable control shaft 19' as illustrated in FIG. 4 and on which can be fastened a rotatable knob 21 as illustrated in FIG. 1, the knob 21 having an indicator 22 thereon for setting adjacent a circular scale 23 on the front surface 24 of the control panel 10 in order to select the temperature that the control system 11 is to maintain in the interior of the transportation vehicle containing such system 11 in a manner hereinafter described.

While the system 11 is described as being vacuum operated, such as being provided by the vacuum source 26, FIG. 5, that is created by the internal combustion engine of a conventional transportation vehicle, it is to be understood that the control system 11 of this invention can be pneumatically operated by air pressure rather than by negative air pressure as desired.

The control panel 10 can include the conventional manually operated electrical switch means 26 and 27 for respectively controlling the blower speed and turning on and off the system as is conventional in the art.

However, the control panel 10 includes the mode selector means 18 that has a rotatable control shaft 28, FIG. 3, for receiving a control knob 29, FIG. 1, the control knob 29 having an indicator means 30 thereon for positioning against a circular scale 31 on the front surface 24 of the control panel 10 so that the operator can select the desired mode of operation of the system 11.

The mode selector 18 is a pneumatic selector of a type that can be similar to the selector means illustrated and claimed in the U.S. Pat. No. 3,143,141 to Beck, and the U.S. Pat. No. 3,286,730 to Beck et al., wherein a fixed reading head 32 is provided with a plurality of passage means 33 that interrupt a reading surface 34 thereof in certain spaced relation and are adapted to be fluidly interconnected together in various selected arrangements thereof as provided by a plurality of channels or blisters 35 formed in a flexible reading member 36 fixed to the rotatable selector means 28 and normally urged toward the reading head 34 by the resiliency of a porous filter means 37.

In this manner, it can be seen that the rotation of the control knob 29 for the selector means 18 will position a different arrangement of the blisters or channel means 35 of the reading sheet 36 relative to the reading surface 34 of the reading head 32 so as to interconnect the passages 33 in different arrangements thereof so that the pneumatic source 25 can be interconnected to various pneumatically operated devices (not shown) to provide for mode selection in the same manner that an electrical mode selector will operate different electrical switches depending upon the rotational position of such mode selector.

Similarly, rotation of the control knob 21 of the set point adjuster 19 of this invention will select the temperature that the system 11 is to maintain whereby the control panel means 10 of this invention does not require the relatively long manually operated lever means of the conventional control panels of transportation vehicles in order to effect the operation of the heat exchanger systems thereof as will be apparent hereinafter.

The set point adjuster 19 of this invention is best illustrated in FIG. 4 wherein the control shaft 19' thereof is rotatably mounted to a housing means 48 that can be fastened to the control panel 24 in any suitable manner. The selector means 19' is provided with a cam surface 38 against which an end 39 of a leaf-spring 40 engages, the leaf-spring 40 having the other end 41 thereof carried by an adjusting member 42 of the housing means 48 so that the intermediate part 43 of the leaf-spring 40 will be bowed against a flange 44 of a rigid cage member 45 of the set point adjuster 19 which, in effect, is a vacuum regulator as will be apparent hereinafter.

The cage member 45 of the set point adjuster 19 is carried by a flexible diaphragm 46 having its outer periphery 47 secured to the housing means 48, the housing means 48 being so shaped that the flexible diaphragm 46 cooperates therewith to define a chamber 49 that is disposed in fluid communication with passge means 50 and 51 respectively formed through a pair of nipples 52 and 53 as illustrated.

The nipple 52 has the passage 50 thereof terminating with a valve seat 54 that is adapted to project through an opening 55 in the cage 45 to be opened and closed by a resilient valve member 56 disposed within the cage 45 and normally being urged toward the opening 55 by the resiliency of a porous filter member 57 disposed within the cage 45.

In this manner, the set point adjuster 19 tends to maintain a certain vacuum valve within the chamber 49 thereof based upon the rotational position of the selector means 19' thereof because the rotational setting of the selector means 19' sets the initial force of the spring 40 tending to pull the cage 45 and, thus, the diaphragm 46 downwardly in FIG. 4 in opposition to the pressure differential that acts across the diaphragm 46 and tends to pull the diaphragm 46 upwardly in FIG. 4 when a vacuum condition exists in the chamber 49.

In particular, the nipple 52 of the set point adjuster 19 is adapted to be interconnected to the vacuum source 25 by the conduit means 58 illustrated in FIG. 5 while the conduit means 53 of the set point adjuster 19 is adapted to be interconnected by the conduit 59 in FIG. 5 to the thermostat 20 of this invention to operate the same in a manner hereinafter set forth.

Thus, should the vacuum value in the chamber 49 of the set point adjuster 19 exceed the value set by the selector means 19', the excess vacuum in the chamber 49 will cause the diaphragm 46 to move upwardly from the position illustrated in FIG. 4 through the resulting increase in the pressure differential across the diaphragm 46 to cause the valve seat 54 to lift the valve member 56 off of the opening 55 of the cage 45 so that air can enter the chamber 49 through the now opened opening 55 of the cage 45 to reduce the vacuum value in the chamber 49 until the same returns to the vacuum value of the setting of the selector shaft 19', at which time the diaphragm 46 again moves downwardly through the reduced pressure differential across the same to permit the valve member 56 to close the opening 55. In contrast, should the vacuum value in the chamber 49 decrease above the setting of the selector shaft 19', the spring 40 will pull the cage 45 and, thus, the diaphragm 46 downwardly in FIG. 4 to open the valve member 55 away from the valve seat 54 so that the vacuum source 25 can further evacuate the chamber 49 to increase the vacuum value thereof back to the vacuum value as selected by the selector means 19' at which time the diaphragm 46 again moves upwardly through the increased pressure differential across the same to have the valve member 56 close the valve seat 54.

In this manner, it can be seen that the set point adjuster 19 is, in effect, a vacuum regulator which will provide a vacuum value in the chamber 49 thereof that corresponds to the setting of the selector shaft 19' thereof for a purpose hereinafter described. However, the set point adjuster 19 of this invention is also adapted to automatically adjust itself according to outside temperature as will be apparent hereinafter by having the spring member 40 thereof also comprise a bimetal member for a purpose hereinafter described.

The improved thermostat construction 20 of this invention includes a housing means 60 formed from a plurality of parts as illustrated whereby a flexible diaphragm 61 can cooperate with the housing means 60 to define a chamber 62 similar to the chamber 49 of the set point adjuster 19 previously described, the housing means 60 having a pair of passages 63 and 64 respectively being adapted to be fluidly interconnected to the chamber 62 and being formed through nipples 65 and 66 of the housing means 60.

The nipple 65 is adapted to be interconnected to the vacuum source 15 by the conduit means 67 while the nipple 66 is adapted to be interconnected by a conduit means 67' to a chamber 68 of a pilot valve means 69 of the pneumatically operated device 12 for a purpose hereinafter described.

The passage 63 of the nipple 65 terminates in a valve seat 70 that projects through an opening 71 of a cage member 72 carried by the diaphragm 61 and containing a movable flexible valve member 73 that is normally urged to close the opening 71 by the resiliency of a porous filter member 74 disposed within the cage 72 as illustrated.

A bimetal member 75 of the thermostat construction 20 has an intermediate portion 76 thereof fastened between a stem member 77 and the cage 72 so as to move in unison therewith, the bimetal member 75 having its opposed ends 78 and 79 respectively engaging against adjustable members 80 and 81' carried by the housing means 60 as illustrated in FIG. 5 whereby the bimetal member 75 tends to move the cage 72 relative to the valve seat 70 in relation to sensed temperature in a manner hereinafter described.

The thermostat construction 20 of this invention has an adjustable temperature setting means that is generally indicated by the reference numeral 81 in FIG. 5 and is pneumatically operated.

In particular, the temperature setting means 81 of the thermostat construction 20 includes a flexible diaphragm 82 carried by the housing means 60 to cooperate therewith and define a chamber 83 that is fluidly interconnected to a passage means 84 that passes through another nipple 85 of the housing means 60 that is interconnected to the conduit means 59 leading from the set point adjuster 19, the diaphragm 82 having a rigid diaphragm backup plate 86 carried thereby and which is integral with the stem 77 as illustrated in FIG. 5.

In this manner, the pressure differential acting across the flexible diaphragm 82 will tend to position the intermediate portion 76 of the bimetal member 75 in a certain position for the particular vacuum value in the chamber 83 and, thus, will cause the bimetal member 75 to operate the cage 72 in a manner to tend to maintin a certain vacuum value in the chamber 62 for the particular vacuum value being maintained in the chamber 83 by the set point adjuster 19.

For example, the cage 72 is moved upwardly relative to the valve seat 70 by the bimetal member 75 should the temperature sensed by the device by the bimetal member 75 fall below the temperature value corresponding to the vacuum value in the chamber 83 to thereby cause the vacuum source 25 to increase the vacuum value in the chamber 62 through the opening of the valve seat 70 and set the device 12 in a new position thereof as will be apparent hereinafter. Conversely, should the bimetal member 75 sense a temperature that exceeds the termperature value corresponding to the vacuum value in the chamber 83 thereof, the bimetal member pushes downwardly on the diaphragm 61 to have the valve seat 70 open the opening 71 of the cage 72 to thereby permit air to bleed into the chamber 62 to decrease the vacuum value therein and set the device 12 to a new position thereof as will be apparent hereinafter. Thus, the thermostat construction 20 of this invention will tend to provide a vacuum value to the pilot chamber 68 of the device 12 which will create an output temperature effect of the heat exchanger 14 for the automobile that corresponds to the temperature setting of the set point adjuster 19 as will be apparent hereinafter Therefore, it can be seen that the thermostat construction 20 of this invention can be formed from relatively few parts so as to be pneumatically settable to operate in a manner hereinafter set forth in connection with a description of the general operation of the system 11.

The pneumatically operated device 12 of the system 11 is of the type disclosed and claimed in the copending patent application, Ser. No. 864,374, filed Dec. 27, 1977 wherein the pilot valve means 69 controls the vacuum value created in a chamber 86 of the pilot valve means 69 that is adapted to be fluidly interconnected by a fixed valve seat 87 to the conduit means 88 leading to the vacuum source 25. The chamber 86 is also interconnected by a passage 89 of the housing means 90 of the device 12 to a main chamber 91 thereof that is defined in part by the housing means 90 and a flexible diaphragm 92 that is normally urged to the extended position illustrated in FIG. 5 by a compression spring 93 disposed in the chamber 91.

The pilot valve means 69 includes a pair of opposed diaphragm means 94 and 95 with the diaphragm means 94 comprising two diaphragm members respectively separating the chambers 68 and 86 from each other while the diaphragm 95 separates the chamber 86 from another chamber 96 of the device 12 formed between the diaphragm 95 and a diaphragm 97 that isolates the chamber 96 from the main chamber 91, the chamber 96 being interconnected to the atmosphere by a vent opening 96' in housing means 90.

A feedback tension spring 97' is interconnected to a rigid means 98 that projects through the diaphragm 97 while the other end is interconnected to an adjustable means 99 carried by the diaphragm 92, the adjustable means 99 also including an arm 100 that interconnects to the pivotally mounted damper 13 of the heat exchanger means 14.

The rigid means 98 carried by the diaphragm 95 of the pilot valve means 69 includes a cage member 101 having an opening 102 receiving the fixed valve seat 87 and containing a movable valve member 103 that is normally urged to close the opening 102 by a resilient porous filter member (not shown) whereby the valve member 103 and valve seat 87 cooperate together to tend to maintain a certain vacuum value in the chamber 86 depending upon the vacuum value being created in the chamber 68 by the thermostat in substantially the same manner as the chamber 62 of the thermostat construction 20 and therefore need not be further described to understand the operation of the device 13. However, if further information of the operation and details of the device 12 is desired, see the aforementioned copending application.

From the above, it can be seen that the system 10 of this invention can be formed in a relatively simple manner so that the thermostat 20 can be remotely located relative to the control panel means 10 and still be adjusted by the set point adjuster 19 without requiring a large lever arrangement as in the conventional heat exchanger system for transportation vehicles, the mode selector 18 also permitting such compact control panel means 24 for the reasons previously set forth.

The operation of the control system 11 and the improved thermostat construction 20 and set point adjuster 19 of this invention will now be described.

Assuming that the operator has set the selector means 29 of the mode selector 18 to the desired operating condition thereof, the operator can turn the control knob 21 of the set point adjuster 19 to the desired output temperature effect that the heat exchanger 14 is to maintain.

For example, the operator can set the control knob 21 for the 72° F. setting illustrated in FIG. 1 whereby the system 11 will tend to maintain the output effect of the heat exchanger 14 at approximately 72° F. as long as the temperature outside the vehicle containing the system 10 is about 75° F. as will be apparent hereinafter.

In particular, the rotation of the selector knob 21 to the desired temperature setting thereof sets the cam surface 38 of the selector means 19' thereof so that the spring 40 is set to tend to maintain a vacuum value in the chamber 49 of the vacuum regulator 19 that will correspond to a vacuum value that will set the thermostat 20 to 72° F. setting thereof as previously described. In this manner, should the thermostat 20 sense a temperature other than a 72° F. temperature for the output effect of the heat exchanger 14 the thermostat 20 in the manner previously described will cause the positioner 12 to change the position of the damper 13 of the heat exchanger 14 to a position which will produce an output temperature effect of approximately 72° F.

Therefore, it can be seen that the system 11 through the setting of the selector shaft 19' of the vacuum regulator or set point adjuster 19 creates a vacuum value in the chamber 49 thereof which corresponds to a particular temperature setting, such vacuum value in the chamber 49 of the set point adjuster 19 creating that vacuum value in a chamber 83 of the thermostat 20 so that the thermostat 20 will tend to create a vacuum value in the chamber 62 thereof which corresponds to the selected temperature setting. The vacuum value in the chamber 62 of the thermostat 20 tends to create that vacuum value in the chamber 68 of the pilot means 69 of the positioner 12 to cause the positioner 12 to create a vacuum value in the main chamber 86 thereof and, thus, in the main chamber 91 thereof that will position the diaphragm 92 to continue to create the selected output temperature effect of the heat exchanger means 14 to maintain the bimetal member 75 of the thermostat construction 20 at the 72° F. setting thereof as caused by the set point adjuster 19.

For example, should the output temperature effect being sensed by the bimetal member 75 of the thermostat construction 20 fall below the desired 72° F. setting that corresponds to the set vacuum value in the chamber 83 thereof, the bimetal member 75 warps in a manner to move the diaphragm 61 upwardly to move the valve member 73 away from the valve seat 70 to thereby permit the vacuum source 25 to increase the vacuum value in the chamber 62. This increase in the vacuum value in the chamber 62 causes a corresponding increase in the vacuum value in the chamber 68 of the pilot valve means 69 to cause the rigid means 98 to move upwardly and thereby interconnect the vent chamber 96 through the now open opening 102 of the cage 101 to the chamber 86 and thereby reduce the vacuum value in the output chamber 86 and, thus, in the main chamber 91 of the pneumatically operated device 12.

The reduction of the vacuum value in the chamber 91 of the device 12 decreases the pressure differential across the diaphragm 92 and permits the compression spring 93 to move the diaphragm 92 downwardly in the drawings to a new position thereof to cause the damper 13 to permit more heated air to be directed by the heated air conduit 17 into the mixing chamber 16 then previously to thereby increase the output temperature effect of the heat exchanger means 14 that will be sensed by the bimetal member 75 of the thermostat 20.

In this manner, once the output temperature effect of the heat exchanger means 14 again reaches the selected 72° F., the thermostat construction will have its bimetal member 75 thereof warp backwardly to permit the cage 72 to close the valve member 73 against the valve seat 70 and thereby disconnect the vacuum source 25 from the chamber 62 thereof.

Also the feedback spring 97' of the device 12 has been extended by the downwardly moving diaphragm 92 whereby the feedback spring 97' pulls downwardly on the rigid means 98 with a greater force to cause the valve member 103 to again close the opening 102 of the cage 101 so that the device 12 will now remain in the new position of FIG. 5 causing the damper 13 to produce the output temperature effect that will maintain the bimetal member 75 in the 72° F. setting position thereof.

Conversely, an increase in the output temperature effect being sensed by the bimetal member 75 above the 72° F. position thereof will cause the bimetal member 75 to warp downwardly in FIG. 5 and thereby move the cage 72 downwardly so that the valve seat 70 will move the valve member 73 away from the opening 71 to thereby permit the atmosphere to bleed into the chamber 62 through the now open opening 71 to decrease the vacuum value in the chamber 62 thereof. This decrease in the vacuum value of the chamber 62 of the thermostat construction 20 causes a similar reduction in the vacuum value in the pilot chamber 68 of the pilot means 69 of the device 12 to permit the tension spring 97' to pull the means 98 downwardly and thereby move the valve member 103 away from the valve seat 87 so that the vacuum source 25 is interconnected to the chamber 86 to increase the vacuum value in the chamber 86. This increase in the vacuum value in the chamber 86 causes an increase in the vacuum value in the main chamber 91 so that the resulting increase in pressure differential across the diaphragm 92 will cause the diaphragm 92 to move upwardly in FIG. 5 in opposition to the force of the compression spring 93 to set the damper 13 to a position to permit more chilled air from the conduit means 15 to enter the mixing chamber 16 than before to thereby reduce the output temperature effect of the heat exchanger means 14.

This reduction in the output temperature effect of the heat exchanger means 14 is now sensed by the bimetal member 75 so that when the same reaches the 72° F. setting thereof, the thermostat construction 20 will be back in the condition illustrated in FIG. 5 wherein the valve member 73 is again closing the opening 71 to disconnect the atmosphere from the chamber 62.

Also, the upwardly moving diaphragm 92 of the device 12 reduces the force of the tension spring 97' that is pulling downwardly on the means 98 so that the cage 101 moves upwardly to permit the valve member 103 to again close the valve seat 87 and disconnect the vacuum source 25 from the output chamber 86 whereby the positioner 12 now remains in the new position thereof.

Therefore, it can be seen that the system 11 of this invention will tend to maintain the output temperatureeffect in the interior of the vehicle containing the same at the temperature setting of the set point adjuster 19 which is mounted on the dash board of the vehicle while the thermostat construction 20 can be mounted anywhere remotely therefrom to sense the output temperature effect of the heat exchanger means 14.

However, as previously described, the set point adjuster 19 of this invention is adapted to be automatically adjusted in relation to the temperature outside of the vehicle because it has been found that when the outside temperature falls to around 0° F., even though the inside temperature is being maintained at 72° F., it feels colder inside the vehicle whereby it is desired that the actual output temperature effect in the vehicle will be at some increased temperature from the setting thereof when the outside temperature is 0° F. than when the outside temperature is 75° F.

Therefore, it can be seen in FIG. 4 that a conduit means 105 is positioned to have its outlet 106 adjacent the bimetal spring member 40 of the set point adjuster 19 with the conduit 105 being interconnected to the outside air duct 107 of a blower 108 that supplies outside air to the heat exchanger system 14.

Thus, outside air is continuously being directed by the blower 108 through the sensing tube 105 to the bimetal member 40 of the set point adjuster 19 so that the bimetal member 40 is constantly sensing the outside temperature.

In this manner, as long as the outside temperature being sensed by the bimetal member 40 of the set point adjuster 19 is around 75°, the 72° setting of the selector means 19' thereof will produce an actual output temperature effect in the vehicle at around 72° F. in the manner previously described.

However, the bimetal member 40 is so selected that the same will create a temperature setting for the set point adjuster 19 approximately 5° higher than the actual cam setting 38 of the selector means 19' when the outside temperature has fallen to approximately 0° F. so that when the outside temperature is approximately 0° F., the bimetal member 40 will cause the vacuum value in the chamber 49 thereof to be almost the same as if the selector means 19' had been set for 77° F. whereby the system 11 will tend to maintain the output temperature effect of the heat exchanger means 14 for the vehicle containing the system 11 at approximately 77° F. in the manner previously described.

Thus, it can be seen that by forming the spring member 40 of the set point adjuster 19 of this invention from a bimetal member and having the same sense outside temperature through the small tube 105, the set point adjuster 19 will automatically adjust the temperature setting thereof between a range of approximately 0° F. from the actual temperature setting of the sensing means 19' when the outside temperature is approximately 75° F. to an increase of the temperature setting of the adjuster 19 of approximately 5° above the actual cam setting of the selector means 19' when the outside temperature falls to approximately 0° F.

If desired, the conduit means 105 could be interconnected to the housing means 48 of the set point adjuster 19 through the use of another nipple means or the housing means 48 as indicated by the dash-dotted lines 109 in FIG. 4.

In any event, it can be seen that the set point adjuster 19 includes means for sensing the outside temperature in order to automatically modify the manual temperature setting thereof.

From the above, it can be seen that the invention not only provides an improved pneumatic control system and improved thermostat construction and set point adjuster therefor, but also this invention provides improved methods of making such thermostat construction and set point adjuster.

While the forms and methods of this invention now preferred have been illustrated and described as required by the Patent Statute, it is to be understood that other forms and method steps can be utilized and still fall within the scope of the appended claims.

What is claimed is:

1. In a pneumatic control system for controlling a pneumatically operated device in relation to the operation of a pneumatic signal sending themostat and a pneumatic signal sending set point adjuster that has setting means for selecting the value of the pneumatic signal thereof, said set point adjuster having a temperature sensor for changing said setting means in relation to sensed temperature thereof, said setting means including an adjustable spring member, the improvement wherein said spring member also comprises said temperature sensor.

2. A pneumatic control system as set forth in claim 1 wherein said spring member comprises a bimetal member.

3. A pneumatic control system as set forth in claim 2 wherein said set point adjuster has valve means for producing said pneumatic signal thereof, said bimetal member being interconnected to said valve means to control the same.

4. A pneumatic control system as set forth in claim 3 wherein said setting means includes a cam member operating against said bimetal member to set the spring force of said bimetal member acting on said valve means.

5. A pneumatic control system as set forth in claim 1 and including a passage defining means for directing a fluid to said temperature sensor for said sensor to sense the temperature thereof.

6. A pneumatic control system as set forth in claim 5 wherein said control system is adapted to control a heat exchanger means for a transportation vehicle, said passage defining means being adapted to direct air outside said vehicle to said temperature sensor.

7. A pneumatic control system as set forth in claim 6 and including a dashboard control panel means, said set point adjuster being carried by said panel means.

8. In a method of making a pneumatic control system for controlling a pneumatically operated device in relation to the operation of a pneumatic signal sending themostat and a pneumatic signal sending set point adjuster that has setting means for selecting the value of the pneumatic signal thereof, said set point adjuster having a temperature sensor for changing said setting means in relation to sensed temperature thereof, said setting means having an adjustable spring member, the improvement comprising the step of forming said spring member to also comprise said temperature sensor.

9. A method of making a pneumatic control system as set forth in claim 8 and including the step of forming said spring member froma bimetal member.

10. A method of making a pneumatic control system as set forth in claim 9 and including the step of interconnecting said bimetal member to signal producing valve means of said set point adjustor to control the same.

11. A method of making a pneumatic control system as set forth in claim 10 and including the step of forming said setting means with a cam member operating against said bimetal member to set the spring force of said bimetal member acting on said valve means.

12. A method of making a pneumatic control system as set forth in claim 8 and including the step of disposing a passage defining means for directing a fluid to said temperature sensor for said sensor to sense the temperature thereof.

13. A method of making a pneumatic control system as set forth in claim 12 wherein said control system is adapted to control a heat exchanger means for a transportation vehicle and including the step of forming said passage defining means so as to be adapted to direct air outside said vehicle to said temperature sensor.

14. A method of making a pneumatic control system as set forth in claim 13 and including the step of forming a dashboard control panel means, and securing said set point adjuster to said panel means to be carried thereby.

* * * * *